US011586497B1

(12) United States Patent
Geist et al.

(10) Patent No.: US 11,586,497 B1
(45) Date of Patent: Feb. 21, 2023

(54) PROCESSOR CARD AND INTELLIGENT MULTI-PURPOSE SYSTEM FOR USE WITH PROCESSOR CARD

(71) Applicant: United States of America as represented by the Administrator of NASA, Washington, DC (US)

(72) Inventors: Alessandro Geist, Bethesda, MD (US); Cody Brewer, Greenbelt, MD (US); Robin A. Ripley, Greenbelt, MD (US); Christopher M. Wilson, Greenbelt, MD (US); Nicholas Franconi, Greenbelt, MD (US); Gary A. Crum, Silver Spring, MD (US); David J. Petrick, Severna Park, MD (US); Thomas P. Flatley, Huntingtown, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 42 days.

(21) Appl. No.: 17/023,513

(22) Filed: Sep. 17, 2020

Related U.S. Application Data

(60) Provisional application No. 62/907,026, filed on Sep. 27, 2019.

(51) Int. Cl.
*G06F 11/00* (2006.01)
*G06F 11/10* (2006.01)
(Continued)

(52) U.S. Cl.
CPC ........ *G06F 11/106* (2013.01); *G06F 11/1629* (2013.01); *G06F 30/34* (2020.01); *H03M 13/19* (2013.01)

(58) Field of Classification Search
CPC .............. G06F 11/106; G06F 11/1629; G06F 11/0739; G06F 11/0721; G06F 11/0736;
(Continued)

(56) References Cited

U.S. PATENT DOCUMENTS 8,332,722 B1 * 12/2012 Vera Rojas ...... H03K 19/17764
714/752
9,201,726 B2 * 12/2015 Morris ............. H03K 19/00392
(Continued)

*Primary Examiner* — Joseph D Manoskey
(74) *Attorney, Agent, or Firm* — Heather Goo; Matthew F. Johnston; Trenton J. Roche

(57) ABSTRACT

The present invention relates to a single-board processor card configured for use in a 1U CubeSat payload form-factor multi-purpose architecture, including: a field-programmable-gate-array (FPGA) which is reconfigurable in flight; wherein a configuration memory of the FPGA can be scrubbed in flight to correct errors or upsets; and a radiation-hardened monitor (RHM) which provides radiation mitigation and system monitoring of the single-board processor card, and which reconfigures said FPGA during flight, scrubs the configuration memory, and monitors a health of the FPGA. The 1U CubeSat payload form-factor multi-purpose architecture includes a backplane having a plurality of slots, one of the plurality of slots which accommodates the single-board processor card, wherein the backplane routes signals to a plurality of standard-sized processor cards, interchangeably disposed in any of the plurality of slots.

44 Claims, 4 Drawing Sheets

(51) Int. Cl.
*G06F 30/34* (2020.01)
*H03M 13/19* (2006.01)
*G06F 11/16* (2006.01)

(58) Field of Classification Search
CPC ............ G06F 11/1402; G06F 11/1469; G06F 11/3013; G06F 30/34; H03M 13/19
See application file for complete search history.

(56) References Cited

U.S. PATENT DOCUMENTS

| | | | | |
|---|---|---|---|---|
| 9,589,598 | B1* | 3/2017 | Gilley | G06F 1/26 |
| 9,851,763 | B1* | 12/2017 | Petrick | H05K 1/115 |
| 11,026,331 | B1* | 6/2021 | Flatley | G06F 11/1076 |
| 2011/0107158 | A1* | 5/2011 | Espinosa | G06F 11/106 |
| | | | | 714/54 |
| 2012/0065813 | A1* | 3/2012 | Nguyen | H04B 7/18519 |
| | | | | 701/2 |
| 2015/0367965 | A1* | 12/2015 | Judd | B64G 1/428 |
| | | | | 244/173.1 |
| 2016/0109501 | A1* | 4/2016 | Spark | G08B 5/38 |
| | | | | 348/374 |
| 2018/0285192 | A1* | 10/2018 | Merl | G06F 11/0736 |

\* cited by examiner

PROCESSOR CARD AND INTELLIGENT MULTI-PURPOSE SYSTEM FOR USE WITH PROCESSOR CARD

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to an improved single-board processor card for a small satellite, or CubeSat, the processor card which is used as a central enabling component of a form-factor architecture or Intelligent Multi-Purpose System (IMPS), which allows space mission developers to mix-and-match 1U (10 cm×10 cm×10 cm) CubeSat payloads configured for space mission-specific needs.

2. Description of the Related Art

Advancements in small satellite (SmallSat) technology and miniaturization of sensor technology are enabling innovations in multi-satellite small mission architectures in place of single, monolithic, long-development satellites, to achieve key scientific observations. While SmallSats cannot function as an "all-in-one" complete solution to all mission observables and cannot act as a substitute in all cases (i.e., due to limitations imposed by aperture and instrument size/power/precision for specific measurements), they have proven to be valuable contributors to a number of fields. SmallSats benefit from their comparatively lower cost, rapid development, and high launch-opportunity frequency compared to larger flagship-type missions. SmallSats are proving useful for both single spacecraft (i.e., early technology maturation) and constellations (i.e., commercial viability and multi-measurement science) configurations for science, defense, and industry.

New, innovative CubeSat mission concepts demand modern capabilities such as artificial intelligence (AI) and autonomy, constellation coordination, fault mitigation, and robotic servicing, all of which require vastly more processing resources than legacy systems are capable of providing. Enabling these domains within a scalable, configurable processing architecture is advantageous because it also allows for the flexibility to address varying space mission roles, such as a command and data-handling system, a high-performance application processor extension, a guidance and navigation solution, or an instrument/sensor interface.

Both CubeSat and SmallSat technology advancements are also advantageous for larger spacecraft, since innovation efforts to miniaturize electronics and other components can also be used for larger systems.

Furthermore, concepts for constellations of small spacecraft will need to rely on multi-element autonomy, coordinated fleet navigation, and quality of service and routing for communications. Performing these compute-intensive functions in harsh environments uniquely requires a high-performance onboard computer capable of providing autonomy, robustness, and fault tolerance.

Due to these considerations, a balance must be found between the burgeoning "new-space" approach (focusing on all commercial components and short-duration missions or applications with high risk tolerance) and the "traditional-space" approach (focusing on more stringent requirements for harsher environments and longer lasting missions). Frequently, these challenges can be acutely observed in multi-stage proposals where there is an early risk-reduction flight in a more benign low-Earth orbit (LEO), to build confidence for an extended mission in a harsher environment. Although the affordability of CubeSat electronics, along with the previous space heritage claimed for a pre-existing CubeSat mission in LEO, is much desired when attempting to reuse the same design for a harsher environment, more rigor for qualification, development, and testing may be required, and the new environmental restrictions may prohibit the use of many commercial solutions that have only been proven viable in LEO.

Experience garnered with previous space mission and instrument formulation experiences, shows that a diverse set of payloads can be realized with the same backbone infrastructure of key reused processor cards and the simple addition of one or two processor cards for mission-specific needs.

In fact, prior art processor card—termed the "SpaceCube v2.0 Mini" by NASA—was designed with multiple sections (or processor cards) interconnected with rigid-flex that allowed the system to be mounted close to the mechanical housing panels to conserve volume, and also folded around a detector lens or smaller payload electronics.

However, this configuration had drawbacks. In particular, while the rigid-flex offered the capability of folding the cards, it locked the design fabrication to a single vendor for manufacturing. The card also required laser-drilled microvias that, when combined with the bookbinder rigid flex, made the card difficult to manufacture. Further, although a radiation hardened (rad-hard) monitor was included, the logic gate count in the device was limited, preventing the inclusion of more robust features. Finally, although stacking connectors have become more popular, these types of connectors present a considerable challenge for routing, pin availability, and high-speed signaling across designs, and are more highly detailed.

With respect to AI applications, the most defining challenge for more advanced and capable artificial intelligence on satellites is derived from limitations in the SmallSat platform design. Consequently, these computing restrictions are particularly challenging to machine learning frameworks because a significant amount of progress in deep learning and modern networks has been specifically conducted using graphics processing units (GPUs). Many state-of-the-art network models require high-end GPU devices to run inference, and even more capability is required to train these models. Current space computers would struggle to meet the minimum requirements for complex, deep-learning architectures. Additionally, there are a scarce number of GPUs that have been proven to work in a space environment, while simultaneously meeting the low-power restrictions of SmallSat platforms.

Finally, both an order of magnitude increase in processing power and the ability to reconfigure on-the-fly are required to implement algorithms that detect and react to events, produce data products on-board for applications such as direct downlink, quick look, provide first responder real-time awareness, enable sensor web multi-platform collaboration, and perform on-board lossless data reduction by migrating typical ground-based processing functions onboard, thus reducing on-board storage and downlink requirements. While prior SpaceCube processor systems represented a significant improvement over previous flight processor systems, the processing needs of emerging science missions are exceeding even their capabilities.

Accordingly, CubeSat processor cards for science missions that can overcome all these drawbacks, and which can provide reusable, high-performance computing designs with a supporting infrastructure of cards, as well as reconfiguring crosscutting payload electronics for multiple mission classes and science objectives, are desired. Further, the designs would have to support volume/mass constraints of the CubeSats and SmallSats, and would have to adequately address radiation concerns and parts qualification.

SUMMARY OF THE INVENTION

The present invention relates to an improved single-board processor card for a small satellite, or CubeSat, the processor card which is used as a central enabling component of a form-factor architecture or Intelligent Multi-Purpose System (IMPS) (i.e., a "SpaceCube" reconfigurable system), which allows space mission developers to mix-and-match 1U (10 cm×10 cm×10 cm) CubeSat payloads configured for space mission-specific needs. In one embodiment, the single-board processor card of the present invention is designated by the inventors as the "SpaceCube v3.0 Mini Processor Card" or the like.

In one embodiment, the IMPS harnesses the benefits of the low SWaP-C (size, weight, power, and cost) form factor architecture of CubeSats, while selecting components to meet high-performance requirements for processing and data transfer, and finally combines them with intelligent and novel design practices to improve reliability.

In one embodiment, the single-board computer or processor card, includes a novel field programmable gate array (FPGA), such as a 20 nm Xilinx Kintex UltraScale FPGA, combined with a radiation-hardened monitor (RHM), and extensive input/output (IO) to integrate and interconnect varying processor cards within the IMPS system.

In order to implement a high-reliability for space missions beyond low earth orbits (LEOs), the IMPS and the processor card of the present invention, use radiation-tolerant and radiation-hard qualified flight parts and commercial components while emphasizing a novel architecture synergizing the best capabilities of computer processing units (CPUs), digital signal processors (DSPs), and field programmable gate arrays (FPGAs). This division of tasks is conducted with extensive algorithm profiling and partitioning, matched with mission requirements, to best align computational stages with architecture components. This hybrid approach is realized through the SpaceCube family of data processors that have extensive flight heritage for several cards.

The novel form-factor system architecture of the present invention, with standard-defined pinout configurations and mechanical and electrical specifications for 1U CubeSat cards, allows the backplane and mechanical enclosure to be easily extended. Since these cards adhere to the standard (System-on-Chip, power card, etc.), the form-factor system architecture of the present invention allows the flexibility to configure a payload from a common catalog of cards.

Thus, the present invention achieves a design that not only is affordable for varying space mission environments, but also provides the processing capabilities necessary for onboard computing in a wide range of systems.

The CubeSat-sized form-factor design of the present invention includes multiple CubeSat slices which can meet the needs for a multitude of missions. These interchangeable designs form the structure that allows electronic 1U (10 cm×10 cm) CubeSat processor cards to be heavily reused for other missions. This reusability allows for future designs to benefit from extensive heritage, as well as architecture customizations by a mix-and-match approach from a diverse collection of compatible cards. Targeting reusable design practices and components meets needs for science, commercial space and defense missions.

Accordingly, the IMPS of the present invention provides orders of magnitude increase in performance and capability over typical rad-hard processor-based systems, and significant advances over the previous generation of SpaceCube technology. The present invention also provides substantial improvements in onboard computing capability while maintaining a high degree of reliability and lowering relative power consumption and cost.

In one embodiment, the single-board processor card of the present invention is configured for use in a 1U CubeSat payload form-factor multi-purpose architecture, including: a field-programmable-gate-array (FPGA) which is reconfigurable in flight; wherein a configuration memory of the FPGA can be scrubbed in flight to correct errors or upsets; and a radiation-hardened monitor (RHM) which provides radiation mitigation and system monitoring of the single-board processor card, and which reconfigures the FPGA, scrubs the configuration memory, and monitors a health of the FPGA.

In one embodiment, the single-board processor card of the present invention further includes: a first NAND flash memory module connected to the RHM, and which stores configuration files for the FPGA in a data storage of the first NAND flash memory module; and wherein the RHM uses error detection via page-level global cyclic redundancy (CRC) checks and multiple copies to mitigate against the errors or upsets, and to verify the configuration files in the data storage of the first NAND flash memory module.

In one embodiment, the RHM reconstructs a valid configuration file from a plurality of corrupt configuration files in the data storage, on condition that a plurality of images is corrupted.

In one embodiment, the RHM ensures a programming sequence and a boot sequence of the FPGA are correctly completed and initiates automatic retries of the programming sequence on condition that the programming sequence is not correctly completed.

In one embodiment, the RHM reconfigures the FPGA in flight via a command through a spacecraft to the RHM; and wherein the reconfiguration by the RHM and the scrub of the configuration memory includes one of: blind scrubbing at a periodic time interval or consistent time interval, or smart scrubbing where a continuous readback scrubbing is performed for low latency error detection and correction via frame-level error correction code (ECC) with CRC checks, as the errors or upsets are detected.

In one embodiment, the single-board processor card of the present invention further includes: a high-density, high-speed open-pin field array backplane connector which plugs into a backplane.

In one embodiment, the boot sequence has a selectable booting configuration configured through a SelectMAP interface from one of the backplane or the RHM.

In one embodiment, the single-board processor card of the present invention further includes: a high-speed double-data-rate-3 synchronous dynamic random-access memory (DDR3 SDRAM) memory module with a high-bandwidth interface, to store configuration instructions for the FPGA, and data of active applications; wherein the DDR3 SDRAM is used for error correction code (ECC) such that the FPGA can respond to and mitigate the errors or upsets in the NAND flash memory module.

In one embodiment, the single-board processor card of the present invention further includes: a second NAND flash memory module connected directly to the FPGA, wherein the NAND flash memory module is used to store algorithms and application codes for any hosted soft microprocessor cores, and to store an initial RAM file system (initramfs)-based operating system (OS) when hosting the soft microprocessor cores, and/or used to buffer dynamic application data, such as images or attached instrument data.

In one embodiment, the single-board processor card of the present invention further includes: an analog-to-digital converter (ADC) attached to the FPGA, which collects housekeeping telemetry including power distribution output voltages, and a core current and a temperature of the FPGA.

In one embodiment, the single-board processor card of the present invention further includes: a plurality of inputs/outputs (I/Os) which are used to integrate and interconnect a plurality of single-board processor cards within a form-factor multi-purpose architecture.

In one embodiment, the single-board processor card of the present invention further includes: a plurality of multi-gigabit transceivers (MGTs) connected from the FPGA to the backplane connector; wherein the MGTs network multiple single-board processor cards.

In one embodiment, the single-board processor card of the present invention further includes: a plurality of low voltage differential signaling (LVDS) pairs connected to the backplane connector.

In one embodiment, the FPGA of the present invention has a triple modular redundancy (TMR) which mitigates a radiation environment from changing a configuration memory of the FPGA.

In one embodiment, a 1U CubeSat payload form-factor multi-purpose architecture of the present invention includes: a single-board processor card having a radiation-hardened field-programmable-gate-array (FPGA) which is reconfigurable in flight; wherein a configuration memory of the FPGA can be scrubbed in flight to correct errors or upsets; and a radiation-hardened monitor (RHM) which provides radiation mitigation and system monitoring of the single-board processor card, and which reconfigures the FPGA, scrubs the configuration memory, and monitors a health of the FPGA; and a backplane having a plurality of slots, one of the plurality of slots which accommodates the single-board processor card; wherein the backplane routes signals to a plurality of standard-sized processor cards, interchangeably disposed in any of the plurality of slots.

In one embodiment, one of the plurality of standard-sized processor cards includes a low voltage power converter (LVPC) card that provides isolated secondary voltages for the single-board processor card, along with switched services for different voltages.

In one embodiment, the standard-sized processor cards include: a software-defined radio (SDR) which provides both remote-sensing and communication applications, and a miniaturized global positioning system (GPS) for navigation functionality.

In one embodiment, the standard-sized processor cards include a co-processor card, and an artificial intelligence (AI) accelerator card for artificial intelligence applications; and the single-board processor card is used with the co-processor card and provides hardware acceleration with reduced communication overhead.

In one embodiment, the standard-sized processor cards include a Solid-State Data Recorder (SSDR) card for storage capacity.

In one embodiment, the standard-sized processor cards include a first router card, and a second Ethernet/Time Triggered Ethernet (TTE) router card for TTE/DTN (delay-tolerant-networking) Node applications.

In one embodiment, the single-board processor card serves as a front-end data processor for sensors directly interfaced to the single-board processor card, to process and convert raw sensor-data into compressed information provided to the co-processor card for downlink to a data storage.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to an improved single-board processor card for a small satellite, or CubeSat, the processor card which is used as a central enabling component of a form-factor architecture or Intelligent Multi-Purpose System (IMPS) (i.e., a "SpaceCube" reconfigurable system), which allows space mission developers to mix-and-match 1U (10 cm×10 cm×10 cm) CubeSat payloads configured for space mission-specific needs. In one embodiment, the single-board improved processor card of the present invention, used with the SpaceCube IMPS of the present invention, is designated by the inventors as the NASA "SpaceCube v3.0 Mini Processor Card" or the like.

In one embodiment, the IMPS harnesses the benefits of the low SWaP-C (size, weight, power, and cost) form factor architecture of CubeSats, while selecting components to meet high-performance requirements for processing and data transfer, and finally combines them with intelligent and novel design practices to improve reliability.

The IMPS of the present invention provides orders of magnitude increase in performance and capability over typical radiation-hardened (rad-hard) processor-based systems and significant advances over the previous generation of SpaceCube technology. In order to implement a high-reliability for missions beyond LEO orbits, the IMPS and the processor card of the present invention utilize radiation-tolerant and radiation-hard qualified flight parts. The present invention also provides substantial improvements in onboard computing capability while maintaining a high degree of reliability and lowering relative power consumption and cost.

Figure 1:
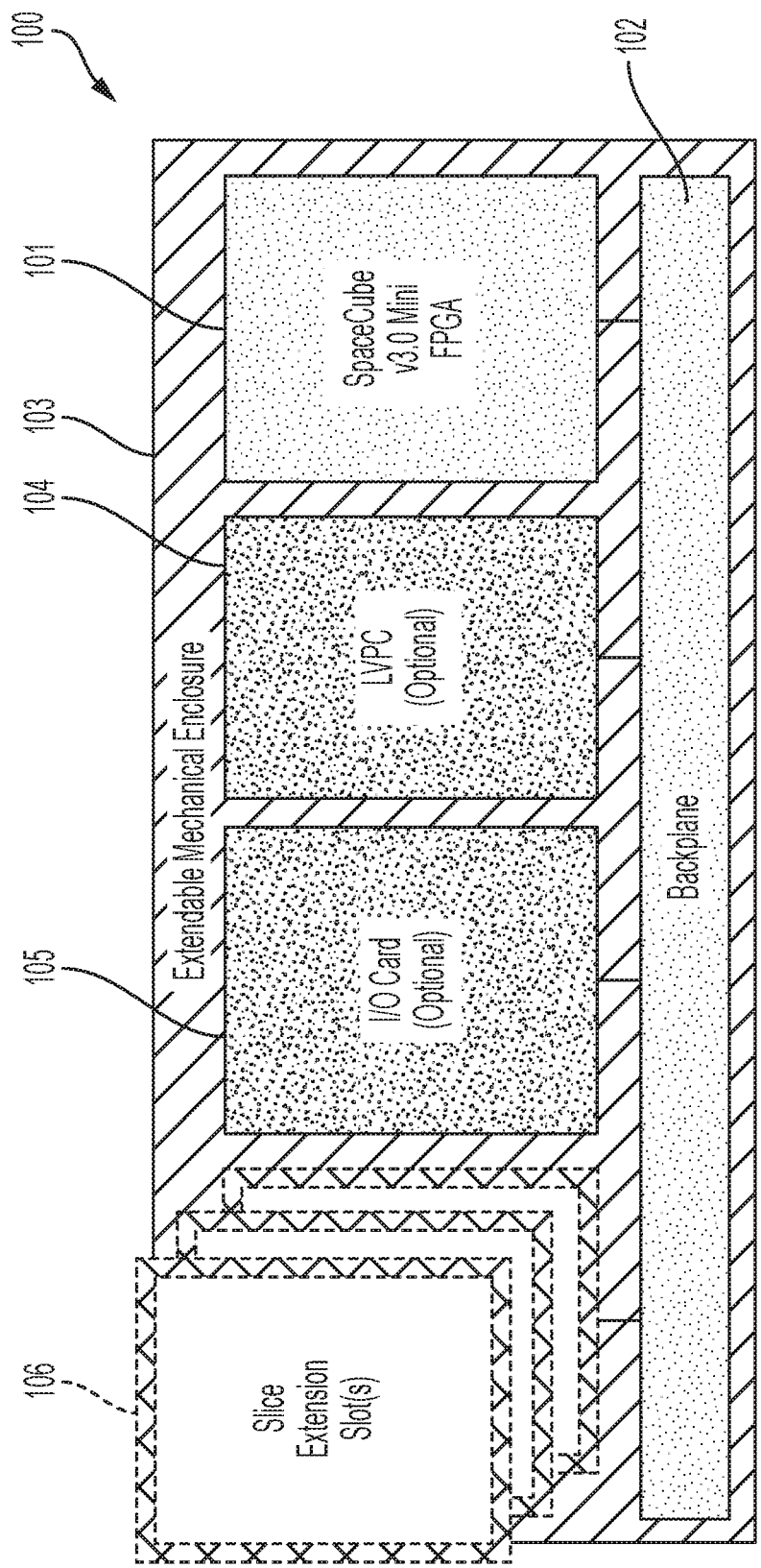
FIG. 1 is a top view functional block diagram of a form factor architecture or Intelligent Multi-Purpose System (IMPS) showing the improved processor card as an enabling component, according to one embodiment consistent with the present invention.

In one embodiment, a generic, form-factor IMPS system architecture 100 of the present invention includes a plurality of computer cards (e.g., cards 101, and 104-106) (see FIGS. 1 and 3) adhering to a standard (i.e., single-board computers, power cards, routers, etc.), and disposed in an extendable mechanical enclosure 103, which allows a user the flexibility to mix-and-match an entire catalog of cards to configure the desired system 100. In one embodiment, the improved single-board processor card 101 of the present invention is the designated "SpaceCube v3 Mini Processor" card 101.

In one embodiment, each of the computer cards 101, 104, 105, 106 used in the IMPS 100 of the present invention, are typically sized at 9 cm×9 cm, typically weigh less than 0.5 lbs., and are low power (<20 Watts for typical applications), such that they can be used interchangeably in varying slotted configurations of the form-factor IMPS architecture 100 to achieve mission requirements.

In one embodiment, the CubeSat computer card standard, including pinout configurations, mechanical, and electrical specifications for the processor card 101 and other 1U CubeSat cards 104-106, is described further below, and allows the backplane 102 and mechanical enclosure 103 to be easily extended with additional slots (for example, slice extension slot 106).

In one embodiment, the processor card 101 of the present invention plugs into the backplane 102 that routes signals to the other standard card (i.e., cards 104-106) slots. In one embodiment, instead of using a rigid-flex design, the backplane 102 favorably allows high-speed signals, such as the gigabits transceivers provided by the processor card 101 (discussed further below), to be routed more easily to other cards 104-106. In one embodiment, the backplane 102 architecture is scalable and easily extended, and also allows cards 101, 104-106 to be swapped out from the IMPS system 100 during integration and testing, without the complexities and concerns of disassembling a stack of cards, that would have been required by past designs.

In one embodiment, in addition to the processor card 101 of the present invention, an input/output (I/O) card 105 may be included in the IMPS 100, featuring standard interfaces (such as M.2 connectors), which allows developers to test prototype devices interfaced to a reliable system 100 architecture with isolation and fault protection.

In one embodiment, yet another card 104 that can be used in the CubeSat card standard specification for the IMPS 100, includes a low voltage power converter (LVPC) 104 that provides clean and isolated secondary voltages for the processor card 101 of the present invention, along with switched services for different voltages. In yet another embodiment, the extension slot 106 can be used for a variety of standard cards which allow for specific mission requirements.

FIGS. 2A-D show three-dimensional perspective views of CubeSat 1U box configurations for varying specifications of computer cards (e.g., cards 201-204) in a SpaceCube IMPS system 200, according to embodiments consistent with the present invention. The following are just a few of the many examples of specific IMPS 100 configurations, where cards (i.e., cards 201-204) may be easily interchanged for mission requirements.

Figures 2A, 2B:
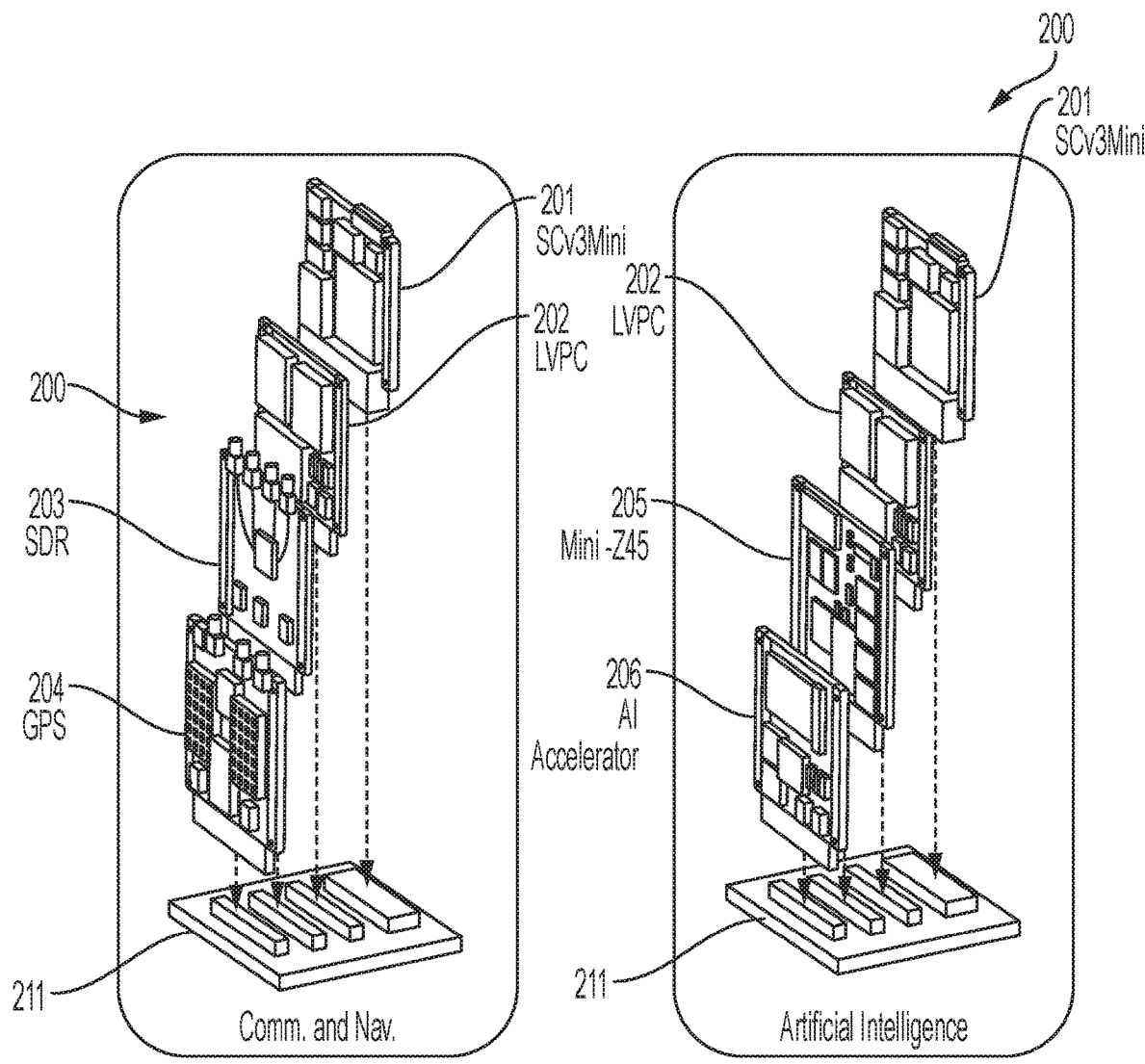
FIGS. 2A-2D are three-dimensional perspective views of a CubeSat 1U box configuration for varying specifications of computer cards in the IMPS system, according to one embodiment consistent with the present invention.

In one embodiment, as shown in FIG. 2A, in addition to the improved processor card 201 of the present invention, and an exemplary low voltage power converter (LVPC) card 202, a software-defined radio (SDR) card 203 provides both remote-sensing and communication applications. Further, in one embodiment, an exemplary miniaturized global positioning system (GPS) card 204, for CubeSats, for example, may also be added for navigation functionality. Thus, in one embodiment, an exemplary form-factor architecture IMPS 200 may contain exemplary interchangeable cards such as the GPS card 204, paired with the SDR card 203 and processor card 201 of the present invention, which provide communications and navigation applications for space missions.

In another embodiment of the IMPS system 200 architecture, as shown in FIG. 2B, in addition to the processor card 201 of the present invention, and LVPC card 202, another processor card, such as the NASA designated "SpaceCube Mini-Z45" card 205, is paired with an artificial intelligence (AI) accelerator 206, for artificial intelligence applications. In one embodiment, the "SpaceCube Mini-Z45" card 205 features a suitable field programmable gate array (FPGA), for example, a Xilinix Zynq-7000 system-on-chip (SoC) (dual-core advanced RISC (reduced instruction set computing) machine (ARM) Cortex-A9, 28-nm FPGA), or the like.

Figures 2C, 2D:
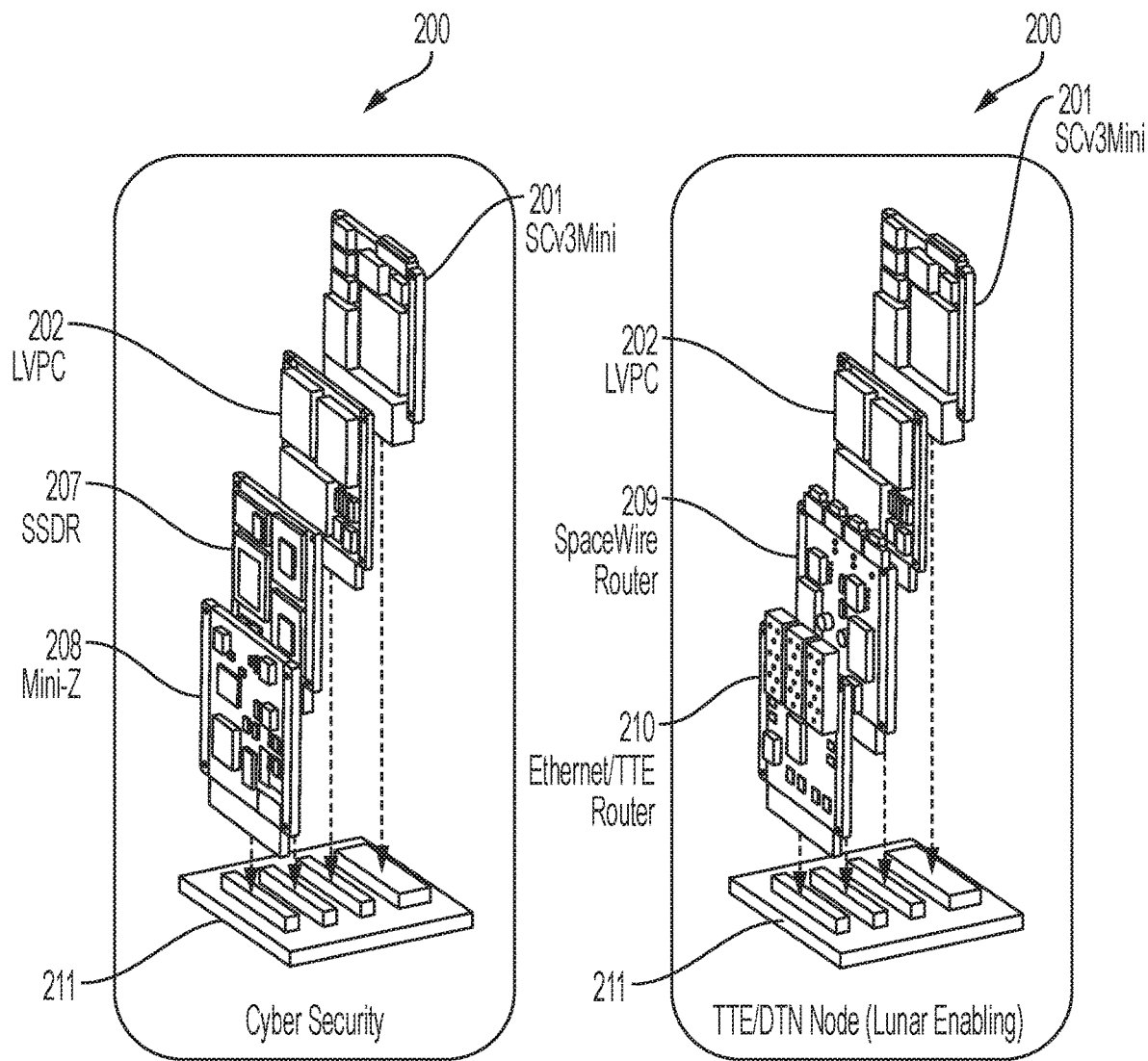

In one embodiment, FIG. 2C shows another exemplary configuration of an IMPS 200 interchangeable architecture, including the single-board processor card 201 of the present invention, an LVPC card 202, and in a configuration which includes another processor card—the NASA designated "SpaceCube Mini-Z" card 208—and a Solid-State Data Recorder (SSDR) card 207 having extensive storage capacity, for use in cyber security applications.

In yet another embodiment consistent with the present invention, as shown in FIG. 2D, the exemplary configuration of the IMPS 200 includes the processor card 201 of the present invention, the LVPC 202 card, a router card 209, such as a SpaceWire card 209, and an Ethernet/Time Triggered Ethernet (TTE) router card 210 for TTE/DTN (delay-tolerant-networking) Node applications.

As shown in FIGS. 2A-2D, these cards 201-210 and more, can be used in varying configurations to mix-and-match the entire catalog to configure the IMPS system 200 of the present invention.

In one embodiment, the improved processor card 300 (see FIG. 3), of the present invention, includes a novel printed circuit board (PCB) design, which adheres to the CubeSat standard and is an enabling component of the IMPS 200 architecture.

In one embodiment, the processor 300 is a novel, 1U CubeSat-sized single-board SpaceCube mini-computer or card 300 (see FIG. 3), which includes as a primary component, a suitable FPGA 301, such as the 20 nm Xilinx Kintex UltraScale FPGA 301, −1 or −2 speed grade Model No. XCKU060-#FFVA1517, or the space-grade Model No. XQRKU060 ceramic column grid array (CGA), or the like.

In one embodiment, the FPGA 301 is selected due to radiation tolerance (when compared to other existing devices), and its good space rating, as well as the large amount of FPGA resources and capabilities it supports. In one embodiment, the FPGA 301 of the present invention may include triple modular redundancy (TMR) to mitigate the radiation environment changing its configuration memory, by triplicating parts of the design and having copies "vote"; if one copy is affected by a radiation event, the other two will still agree and perform the correct operation.

Thus, the FPGA 301 of the present invention, with advantageous radiation tolerance, should achieve reliable operations in varying space environments which are challenging due to radiation effects, and which can incur a broad spectrum of damage and errors from benign bit-flips in unused memory to catastrophic failure of a component.

A major advantage of the FPGA 301 of the present invention, is that, unlike traditional radiation hardened (rad-hard) FPGAs, it can be reconfigured in flight. The processor card 300 of the present invention supports several options for how the FPGA 301 can be advantageously configured and scrubbed (discussed further below).

In one embodiment, the processor card 300 of the present invention allows for larger, more complex designs to fit in a smaller footprint than is possible with traditional rad-hard FPGAs. In addition, the present FPGA 301 supports the latest advancements in FGPA design tools and productivity, allowing easy integration of some of the latest (Xilinx) designs and frameworks, such as the Deep Learning Processor Unit (DPU), Vitis AI, and Vitis High-Level Synthesis, for example.

The FPGA 301 used in the processor card 300 of the present invention, provides orders of magnitude of performance improvement over other existing 1U CubeSat cards, as measured by a metric known as computational density (measured in giga-operations per second (GOPS), to provide a fair, deterministic measurement in comparing the maximum theoretical performance capability of computing devices with different architectures).

In one embodiment, the processor card 300 of the present invention, is combined with a smaller, reconfigurable radiation-hardened monitor (RHM) 302, such as a Microchip RT ProASIC3, or the like, to provide radiation mitigation and system monitoring for the entire processor card 300, and which is more suitable for a condensed CubeSat size. Thus, the processor card 300 includes both an intelligent fault-tolerant board architecture design and internal FPGA 301 mitigations. The FPGA 301 of the present invention leverages the design of a much larger processor card in the SpaceCube family (within the same processor (Xilinx) technology generation) and reduces the core functionality to conform to a CubeSat form-factor (i.e., IMPS 200) design of the present invention.

In one embodiment, the RHM 302 provides the processor card 300 with a variety of features. In another embodiment, the RHM 302 may be removed for a desired application, but the functionality will need to be provided a similar device on a different card.

In one embodiment, the RHM 302 can configure the FPGA 301, scrub the configuration memory to correct upsets, and monitor the health of the FPGA 301 using watchdog timers.

More specifically, in one embodiment, the processor card 300 includes fault-tolerance features including several watchdog and reset lines (3×WDT, 3×RST) (see FIG. 3), for example, for health and status monitoring. In one embodiment, the watchdog frequency and reset requirements are configurable in the RHM 302. In one embodiment, these watchdog timers (WDT, RST) can be used independently to reset different subsets of the FPGA 301, including a top-level design reset.

In one embodiment, the RHM 302 can also be reset through a reset command issued over a (SpaceWire (SPW)) interface (if used) (see FIG. 3), and any of the available FPGA input/output (i.e., 8×3.3V I/O 304, 38× terminated 3.3V I/O 307, 9× non-terminated 3.3V I/O 308, 48×2.8V low voltage differential signaling (LVDS) I/O 311, 24×1.8V LVDS I/O 312) can naturally be configured for this functionality as well.

In one embodiment, the FPGA 301 configuration files of the present invention are stored in external non-volatile memories and the RHM 302 uses error detection (via page-level global cyclic redundancy checks (CRC) checks) and multiple copies (typically dozens of configuration files are stored with redundant copies across multiple internal dies of the NAND flash memory 306) to mitigate against upsets and verify the configuration files in storage. In one embodiment, the RHM 302 can also reconstruct a valid configuration file from several corrupted ones in storage if multiple images are corrupted. In one embodiment, internally, the RHM 302 ensures the FPGA 301 programming and boot sequence is completed correctly and will initiate automatic retries of the programming sequence if required.

In one embodiment, the FPGA 301 can also be reconfigured via command through the spacecraft to the RHM 302. This also enables changing configurations in-flight to support dynamic mission requirements. In one embodiment, the RHM 302 scrubs the FPGA 301 configuration during operation via either blind scrubbing at a consistent time interval (periodic scrubbing) or smart scrubbing, where a continuous configuration readback scrubbing is performed for low latency error detection and correction (via frame-level correction code (ECC) with CRC checks), as the errors are detected.

In one embodiment, the RHM 302 also hosts a SpaceWire (SPW) router (see FIG. 3), with interconnect architecture which allows the vehicle (i.e., spacecraft) to communicate directly to both the RHM 302 and FPGA 301 through the same interface, and which can be used to issue resets if necessary or change configurations entirely to support in-flight dynamic mission reconfiguration. In one embodiment, this allows rapid switching between entirely different functionality for various phases of the operation (i.e., space mission).

In one embodiment, the processor card 300 will have a selectable booting configuration configured through the SelectMAP (SMAP) interface 313 from either the backplane (not shown in FIG. 3, see backplane 211 in FIGS. 2A-2D) or the onboard RHM 302 supervisor. In one embodiment, a companion card or another radiation-hardened processor card could assume the monitoring, booting, and initial configuration of the FPGA 301 in place of the RHM 302 through the backplane, if required.

In one embodiment, supporting components and resources of the processor card 300 of the present invention include, for volatile memory resources, a memory module 303, such as a 2 GB (72-bit wide) high speed double data rate 3 synchronous dynamic random-access memory (DDR3 SDRAM) memory module 303, or the like, as a synchronous dynamic RAM with a high bandwidth interface, to store the instructions and data of active applications. In one embodiment, the extra byte provided by the memory module 303 is used for ECC (Error-Correcting Code) so that the FPGA 301 can respond to and mitigate upsets in the memory module 303. More specifically, in one embodiment, the memory module 303 is typically used to store an initial RAM file system (initramfs)-based operating system (OS) when hosting soft microprocessor cores (e.g., MicroBlaze, RISC-V, or the like) and/or used to buffer dynamic application data, such as images or attached instrument data.

In one embodiment, the processor card 300 of the present invention may be used in missions which rely on a softcore processor to perform minor computational tasks. In one embodiment, multiple soft-core processors can be instantiated in the FPGA 301 depending on mission requirements. These are not always relegated to "minor" tasks and can satisfy a significant portion of a mission's processing needs, depending on the specific algorithm being run.

In one embodiment, for non-volatile memory, the processor card 300 of the present invention includes two 16 GB NAND flash memory modules 305, 306 for storing algorithm and application codes for any hosted soft processors. In one embodiment, one flash memory module 305 is connected directly to the FPGA 301 to store operating system (OS) boot images and/or finalized or intermediate application data products.

In one embodiment, the other identical flash memory module 306 is connected to the radiation-hardened monitor (RHM) 302, which will be typically used to store configuration files for the FPGA 301, but can also be used for slower transfer long-term data storage. In total, the processor card 300 of the present invention provides 32 GB of NAND flash memory, although some portion of the storage would need to be allocated for redundant boot images for fault tolerance.

In one embodiment, the FGPA 301 of the present invention has an attached analog-to-digital converter (ADC) 317 band associated circuitry for collecting housekeeping telemetry such as the power distribution output voltages, the FPGA 301 core current, and device temperature.

In one embodiment, the processor card 300 of the present invention includes extensive input/output (IO) 304, 307, 308, 309, 311, 312 (described above), which are used to integrate and interconnect various computer cards 104-106, 203-210 within the IMPS system 100, to accommodate the immense volume and speed requirements that may be imposed by high-performance detectors and sensors. These I/O interconnects 304, 307, 308, 309, 311, 312 of the present invention are significant, in order to meet next-generation processing requirements. Routing differential traces between large through-hole vias can be difficult or impossible when trying to meet flight printed circuit board manufacturing standards; thus, in order to make this routing possible for the processor card 300, the non-functional pads were removed from layers of dense I/O interconnect.

In one embodiment, unlike some commercial options, the processor card 300 of the present invention includes 12× multi-gigabit transceivers (MGTs) 309 connected from FPGA 301 to backplane connector 310 (i.e., a Samtec connector) that can provide a transmission rate of 12.5 Gbps (−1 speed grade) or 16.3 Gbps (−2 speed grade) each, for example.

Figure 3:
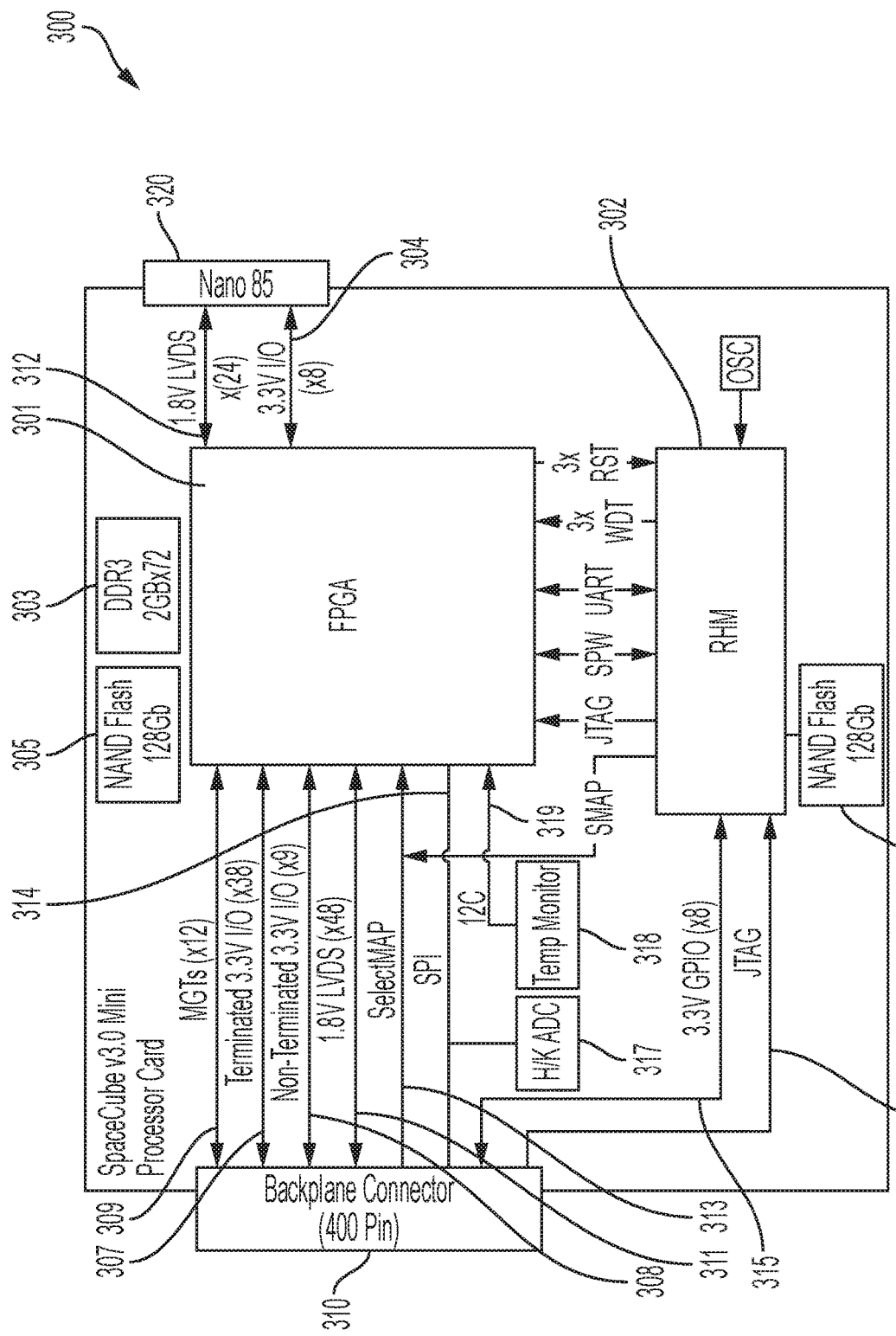
FIG. 3 is a top view functional block diagram of an improved processor card according to one embodiment consistent with the present invention.

In one embodiment, the processor card 300 is designed so that multiple similar processor cards 300 can be networked together using a SpaceWire (SPW) interface and/or the MGTs 309 (see FIG. 3).

In one embodiment, as mentioned above, the computer card 300 of the present invention includes 48× low voltage differential signaling (LVDS) pairs 311 (which can also be configured as 96×1.8V single-ended I/O), and an assortment of interfaces, including 47×3.3V general purpose input/output (GPIO) pins 307, 308, which are connected to the backplane connector 310. Also connected to the backplane connector 310 are a SelectMAP (SMAP) 313, a serial peripheral interface (bus) (SPI) 314, 8×3.3V GPIO pins 315, and a joint test action group (JTAG) 316 (see FIG. 3).

In one embodiment, the FPGA 301 of the present invention is the master of the on-board serial peripheral interface (SPI) bus 314, which is connected to a housekeeping 12-bit, 8-channel analog-to-digital (ADC) 317 for current, voltage, and thermistor monitoring. In one embodiment, additional slave devices can be added to this bus 314 over the backplane connector 310. In one embodiment, there is also a discrete integrated circuit (IC) 318 that monitors the FPGA 301 internal temperature diode, which can be read by the FPGA 301 over an I-squared-C (I2C) multi-master, multi-slave, packet switched, single-ended, serial communication bus 319.

In one embodiment, the optional front-panel 85-pin Nano connector 320 provides 24×LVDS pairs 312 (and 311) (can also be configured as 48×1.8V single-ended I/O) and an 8×3.3V GPIO 304. The FPGA 301 of the present invention also supports a variety of interfaces including, for example, Peripheral Component Interconnect Express (PCIe), Aurora, Serial Rapid I/O (SRIO), SATA, and 10 G/20 G Ethernet over the 12× Multi-Gigabit Transceivers (MGTs) 309, and UART (a debug interface between RHM 302 and FPGA 301).

As shown in FIG. 2, and discussed briefly above, to provide the flexibility and interoperability to mix-and-match varying designs, a novel system and standard or template was developed and deemed the CubeSat Card Standard (also known as $CS^2$) (also known as a form-factor design or architecture), which establishes baseline configurations to develop CubeSat 1U-type cards compatible with several space programs.

In one embodiment, the CubeSat Card Standard establishes the common interface between CubeSat cards, encourages design reuse, and provides a convenient reference to integrate with the numerous cards (and mechanical structures) supported by the SpaceCube family of designs.

In one embodiment, the CubeSat Card Standard card systems are capable of supporting high-speed data transfers. Thus, in order to meet the numerous high-speed I/O interfaces required by the latest generation science instruments and applications, a high-density backplane connector 310 is needed. Thus, the processor card 300 of the present invention uses a connector 310, such as a high density, 400-Pin Samtec SEARAY high speed open pin field array connector 310, or the like, to plug into the backplane 211 (see FIGS. 2A-2D) (or backplane 102). These connectors 310 support rates at least as high as 12.5 GHz or 25 Gbps, which is significantly faster than the rates that can be sustained by other devices for existing SpaceCube designs.

In one embodiment, each computer card 201-210, as shown in FIGS. 2A-2D, has a separate chassis ground net (CGND) for the box chassis, and has a main signal ground net (GND) that is connected to multiple internal copper planes and to signal ground pins on the backplane connector (not shown here) and (optional) front-panel connector (not shown). Each computer card 201-210 has an optional selective population of a parallel resistor and capacitor (not shown) in the four corners of the PCB 211 which allow for single-point grounding (path between GND and CGND—this should be the only path between the two ground planes) to be maintained and adjusted as needed.

As discussed briefly above, FIGS. 2A-2D, show exemplary embodiments of the IMPS 100, 200 architecture, such as an application in communications and navigation (FIG. 2A), in artificial intelligence (AI) (FIG. 2B), in SmallSat cybersecurity (FIG. 2C), and in a TTE/DTN Node (FIG. 2D), and how the processor card 201 of the present invention is used as the central enabling component.

In one embodiment, with respect to artificial intelligence (AI), as shown in FIG. 2B, a small form-factor dedicated AI processing unit can be strategic for both science and defense applications, and the present processor card 200 can enable essential AI applications.

More specifically, as shown in FIG. 2B, such an AI application configuration, would include an LVPC card 202, another processor card 205 such as the "SpaceCube Mini-Z45" card 205, and the processor card 201 as the central component. In addition, an AI Accelerator 206, which speeds operations commonly required for AI applications or tasks, is included.

In one embodiment, the integration of the processor card 205 (i.e., the "SpaceCube Mini-Z45" card 205) and processor card 201 of the present invention, interconnected by high-speed interfaces in a CubeSat form-factor such as the IMPS 200, can enable two configurations for advanced applications, such as semantic segmentation, necessary for high-performance onboard processing. Semantic image segmentation is used to infer dense labels for every pixel of an image (i.e., a deep learning algorithm, based on convolutional neural networks (CNNs)), and is enabled by a reconfigurable CNN acceleration framework (ReCoN) loaded onto the AI Accelerator 206. Semantic segmentation has numerous space applications, from semantic labeling of Earth's features for insights about the changing planet, to monitoring natural disasters, and to gathering intelligence for national security.

In one embodiment, the processor card 201 of the present invention serves as a co-processing card. For instance, another processor card 205, such as the "SpaceCube Mini-Z45" card 205, for example, can offload massive workloads to the present processor card 201 for hardware acceleration with minimal communication overhead (i.e., the advantage of the present FPGA 301 which can accelerate tasks in hardware as opposed to using a soft processor core).

In another embodiment, the processor card 201 of the present invention, serves as a front-end data processor for sensors directly interfaced to this card. In this configuration, the processor card 201 can process and convert raw sensor-data into compressed, actionable results or scientific knowledge provided to another processor card 205, such as the "SpaceCube Mini-Z45" card 205 for downlink to storage. A comparison between the inference performance of the accelerated application showed results that demonstrated a massive 1733× speedup over a purely software baseline run on previous processors.

In other embodiments, configurations for a reusable payload design are driven by needs in communication and navigation (FIG. 2A), as well as SmallSat cybersecurity (FIG. 2C). With the growing SmallSat industry, it has been noted by defense and research sectors that cybersecurity concerns are often overlooked for spacecraft, and many may be vulnerable to cyberattacks. This emphasis becomes more significant with future plans for constellations enabling capabilities which will feature cross-link communication along with relay links.

Thus, the present invention's IMPS 200 is a reconfigurable and reusable system which allows users to meet future science and defense needs for several mission types. The novel CubeSat Card Standard specification (i.e., IMPS 100, 200) allows future developers to design cards to be compatible with the system 200 allowing more combinations of cards to be used to address new mission proposals. The present architecture design is advantageous for instruments that can be repurposed to varying science observables without significant changes to the electronics processing cards. The IMPS 100, 200 architecture of the present invention provides high-performance processing, reliability, and the affordability of SWaP-C characteristics intrinsic with a 1U CubeSat form factor, and is immediately relevant for applications in instrument processing, artificial intelligence, communication and navigation, and finally cyber security and encryption.

In addition to providing orders of magnitude improvement in computing power over state-of-the-art radiation-hardened (rad-hard) flight processor systems in a mechanical package that is 5-10 times smaller, the processor card 300 of the present invention is a high-reliability processor system with built-in radiation and fault mitigation features. The majority of commercial CubeSat/SmallSat processors are only designed for LEO orbit, but because the processor card 300 of the present invention is designed with high-reliability components and fault-mitigation techniques, it is capable of operating in harsher environments and supporting higher class missions than these commercial, currently available market options.

Accordingly, the present invention is suited for science and military applications seeking a miniaturized, high performance system, and is ideal for CubeSats, SmallSats, unmanned aerial vehicles (UAVs), sounding rockets, robotics, and exploration missions. In addition, such a powerful flight-processor system in such a small form factor is highly advantageous. In particular, the core technology development can be deployed in a lunar orbit to provide a communications and navigations node as part of LunaNet, execute high-performance, finely tuned precision landing algorithms for lunar landers, and be additionally reconfigured to provide mobility guidance capabilities for lunar robots and rovers on the surface.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A single-board processor card configured for use in a 1 U CubeSat payload form-factor multi-purpose architecture, the single-board processor card comprising:

a field-programmable-gate-array (FPGA) which is reconfigurable in flight, wherein a configuration memory of said FPGA can be scrubbed in flight to correct errors or upsets; and a radiation-hardened monitor (RHM) which provides radiation mitigation and system monitoring of the single-board processor card, and which reconfigures said FPGA during said flight, scrubs said configuration memory, and monitors a health of said FPGA, wherein said RHM ensures a programming sequence and a boot sequence of said FPGA are correctly completed, and initiates automatic retries of said programming sequence on condition that said programming sequence is not correctly completed and, wherein said boot sequence has a selectable booting configuration configured through a SelectMAP interface from one of said backplane or said RHM.

2. The single-board processor card of claim 1, the single-board processor card further comprising:

a first NAND flash memory module connected to said RHM, and which stores configuration files for said FPGA in a data storage of said first NAND flash memory module; and wherein said RHM uses error detection via page-level global cyclic redundancy (CRC) checks and multiple copies to mitigate against said errors or said upsets, and to verify said configuration files in said data storage of said first NAND flash memory module.

3. The single-board processor card of claim 2, wherein said RHM reconstructs a valid configuration file from a plurality of corrupt configuration files in said data storage, on condition that a plurality of images is corrupted.

4. The single-board processor card of claim 2, wherein said RHM reconfigures said FPGA in said flight via a command through a spacecraft to said RHM; and wherein said reconfiguration by said RHM and said scrub of said configuration memory includes one of:

blind scrubbing at a periodic time interval or consistent time interval, or smart scrubbing where a continuous readback scrubbing is performed for low latency error detection and correction via frame-level error correction code (ECC) with said CRC checks, as said errors or said upsets are detected.

5. The single-board processor card of claim 2, the single-board processor card further comprising:

a high-density, high-speed open-pin field array backplane connector which plugs into a backplane.

6. The single-board processor card of claim 1, wherein said FPGA has a triple modular redundancy (TMR) which mitigates a radiation environment from changing said configuration memory of said FPGA.

7. A 1U CubeSat payload form-factor multi-purpose architecture, the multi-purpose architecture comprising:

a single-board processor card according to claim 1; and
a backplane having a plurality of slots, one of said plurality of slots which accommodates said single-board processor card;

wherein said backplane routes signals to a plurality of standard-sized processor cards, interchangeably disposed in any of said plurality of slots, wherein said standard-sized processor cards include a co-processor card, and an artificial intelligence (AI) accelerator card for artificial intelligence applications, and wherein said single-board processor card is used with said co-processor card to provide hardware acceleration with reduced communication overhead.

8. The multi-purpose architecture of claim 7, wherein one of said plurality of standard-sized processor cards includes a low voltage power converter (LVPC) card that provides isolated secondary voltages for said single-board processor card, along with switched services for different voltages.

9. The multi-purpose architecture of claim 8, wherein said standard-sized processor cards include:

a software-defined radio (SDR) which provides both remote-sensing and communication, and navigation applications, and a miniaturized global positioning system (GPS) for navigation functionality.

10. The multi-purpose architecture of claim 9, wherein said standard-sized processor cards include a Solid-State Data Recorder (SSDR) card for storage capacity.

11. The multi-purpose architecture of claim 9, wherein said single-board processor card serves as a front-end data processor for sensors directly interfaced to said single-board processor card, to process and convert raw sensor-data into compressed information provided to said co-processor card for downlink to a data storage.

12. A 1U CubeSat payload form-factor multi-purpose architecture, the multi-purpose architecture comprising:

a single-board processor card according to claim 1; and
a backplane having a plurality of slots, one of said Plurality of slots which accommodates said single-board processor card, wherein said backplane routes signals to a plurality of standard-sized processor cards, interchangeably disposed in any of said plurality of slots, and wherein said standard-sized processor cards include a first router card, and a second Ethernet/Time Triggered Ethernet (TTE) router card for TTE/DTN (delay-tolerant-networking) Node applications.

13. The multi-purpose architecture of claim 12, wherein one of said plurality of standard-sized processor cards includes a low voltage power converter (LVPC) card that provides isolated secondary voltages for said single-board processor card, along with switched services for different voltages.

14. The multi-purpose architecture of claim 13, wherein said standard-sized processor cards include:

a software-defined radio (SDR) which provides both remote-sensing and communication, and navigation applications, and a miniaturized global positioning system (GPS) for navigation functionality.

15. The multi-purpose architecture of claim 14, wherein said standard-sized processor cards include a co-processor card, and an artificial intelligence (AI) accelerator card for artificial intelligence applications; and wherein said single-board processor card is used with said co-processor card to provide hardware acceleration with reduced communication overhead.

16. The multi-purpose architecture of claim 15, wherein said single-board processor card serves as a front-end data processor for sensors directly interfaced to said single-board processor card, to process and convert raw sensor-data into compressed information provided to said co-processor card for downlink to a data storage.

17. The multi-purpose architecture of claim 14, wherein said standard-sized processor cards include a Solid-State Data Recorder (SSDR) card for storage capacity.

18. The single-board processor card of claim 1, the single-board processor card further comprising:

a second NAND flash memory module connected directly to said FPGA, wherein said NAND flash memory module is used to store algorithms and application codes for any hosted soft microprocessor cores, and to store an initial RAM file system (initramfs)-based operating system (OS) when hosting said soft microprocessor cores, and/or used to buffer dynamic application data, such as images or attached instrument data.

19. The single-board processor card of claim 18, the single-board processor card further comprising:
an analog-to-digital converter (ADC) attached to said FPGA, which collects housekeeping telemetry including power distribution output voltages, and a core current and a temperature of said FPGA.

20. The single-board processor card of claim 19, the single-board processor card further comprising:
a plurality of inputs/outputs (I/Os) which are used to integrate and interconnect a plurality of single-board processor cards within the form-factor multi-purpose architecture.

21. The single-board processor card of claim 20, the single-board processor card further comprising:
a plurality of multi-gigabit transceivers (MGTs) connected from said FPGA to said backplane connector;
wherein said MGTs network multiple single-board processor cards.

22. The single-board processor card of claim 21, the single-board processor card further comprising:
a plurality of low voltage differential signaling (LVDS) pairs connected to said backplane connector.

23. A single-board processor card configured for use in a 1U CubeSat payload form-factor multi-purpose architecture, the single-board processor card comprising:
a field-programmable-gate-array (FPGA) which is reconfigurable in flight, wherein a configuration memory of said FPGA can be scrubbed in flight to correct errors or upsets; and
a radiation-hardened monitor (RHM) which provides radiation mitigation and system monitoring of the single-board processor card, and which reconfigures said FPGA during said flight, scrubs said configuration memory, and monitors a health of said FPGA; and
a high-speed double-data-rate-3 synchronous dynamic random-access memory (DDR3 SDRAM) memory module with a high-bandwidth interface, to store configuration instructions for said FPGA and data of active applications;
wherein said DDR3 SDRAM is used for said error correction code (ECC) such that said FPGA can respond to and mitigate said errors or said upsets in said NAND flash memory module.

24. The single-board processor card of claim 23, the single-board processor card further comprising:
a second NAND flash memory module connected directly to said FPGA, wherein said NAND flash memory module is used to store algorithms and application codes for any hosted soft microprocessor cores, and to store an initial RAM file system (initramfs)-based operating system (OS) when hosting said soft microprocessor cores, and/or used to buffer dynamic application data, such as images or attached instrument data.

25. The single-board processor card of claim 24, the single-board processor card further comprising:
an analog-to-digital converter (ADC) attached to said FPGA, which collects housekeeping telemetry including power distribution output voltages, and a core current and a temperature of said FPGA.

26. The single-board processor card of claim 15, the single-board processor card further comprising:
a plurality of inputs/outputs (I/Os) which are used to integrate and interconnect a plurality of single-board processor cards within the form-factor multi-purpose architecture.

27. The single-board processor card of claim 26, the single-board processor card further comprising:
a plurality of multi-gigabit transceivers (MGTs) connected from said FPGA to said backplane connector;
wherein said MGTs network multiple single-board processor cards.

28. The single-board processor card of claim 27, the single-board processor card further comprising:
a plurality of low voltage differential signaling (LVDS) pairs connected to said backplane connector.

29. The single-board processor card of claim 23, the single-board processor card further comprising:
a first NAND flash memory module connected to said RHM, and which stores configuration files for said FPGA in a data storage of said first NAND flash memory module; and
wherein said RHM uses error detection via page-level global cyclic redundancy (CRC) checks and multiple copies to mitigate against said errors or said upsets, and to verify said configuration files in said data storage of said first NAND flash memory module.

30. The single-board processor card of claim 29, wherein said RHM reconstructs a valid configuration file from a plurality of corrupt configuration files in said data storage, on condition that a plurality of images is corrupted.

31. The single-board processor card of claim 30, wherein said RHM ensures a programming sequence and a boot sequence of said FPGA are correctly completed, and initiates automatic retries of said programming sequence on condition that said programming sequence is not correctly completed.

32. The single-board processor card of claim 29, wherein said RHM reconfigures said FPGA in said flight via a command through a spacecraft to said RHM; and
wherein said reconfiguration by said RHM and said scrub of said configuration memory includes one of:
blind scrubbing at a periodic time interval or consistent time interval, or smart scrubbing where a continuous readback scrubbing is performed for low latency error detection and correction via frame-level error correction code (ECC) with said CRC checks, as said errors or said upsets are detected.

33. The single-board processor card of claim 23, wherein said FPGA has a triple modular redundancy (TMR) which mitigates a radiation environment from changing said configuration memory of said FPGA.

34. A 1U CubeSat payload form-factor multi-purpose architecture, the multi-purpose architecture comprising:
a single-board processor card according to claim 23; and
a backplane having a plurality of slots, one of said plurality of slots which accommodates said single-board processor card;
wherein said backplane routes signals to a plurality of standard-sized processor cards, interchangeably disposed in any of said plurality of slots, wherein said standard-sized processor cards include a co-processor card, and an artificial intelligence (AI) accelerator card for artificial intelligence applications, and wherein said single-board processor card is used with said co-processor card to provide hardware acceleration with reduced communication overhead.

35. The multi-purpose architecture of claim 34, wherein one of said plurality of standard-sized processor cards includes a low voltage power converter (LVPC) card that provides isolated secondary voltages for said single-board processor card, along with switched services for different voltages.

36. The multi-purpose architecture of claim 35, wherein said standard-sized processor cards include:
- a software-defined radio (SDR) which provides both remote-sensing and communication, and navigation applications, and
- a miniaturized global positioning system (GPS) for navigation functionality.

37. The multi-purpose architecture of claim 36, wherein said standard-sized processor cards include a Solid-State Data Recorder (SSDR) card for storage capacity.

38. The multi-purpose architecture of claim 36, wherein said single-board processor card serves as a front-end data processor for sensors directly interfaced to said single-board processor card, to process and convert raw sensor-data into compressed information provided to said co-processor card for downlink to a data storage.

39. A 1U CubeSat payload form-factor multi-purpose architecture, the multi-purpose architecture comprising:
- a single-board processor card according to claim 23; and
- a backplane having a plurality of slots, one of said plurality of slots which accommodates said single-board processor card,
- wherein said backplane routes signals to a plurality of standard-sized processor cards, interchangeably disposed in any of said plurality of slots, and wherein said standard-sized processor cards include a first router card, and a second Ethernet/Time Triggered Ethernet (TTE) router card for TTE/DTN (delay-tolerant-networking) Node applications.

40. The multi-purpose architecture of claim 39, wherein one of said plurality of standard-sized processor cards includes a low voltage power converter (LVPC) card that provides isolated secondary voltages for said single-board processor card, along with switched services for different voltages.

41. The multi-purpose architecture of claim 40, wherein said standard-sized processor cards include:
- a software-defined radio (SDR) which provides both remote-sensing and communication, and navigation applications, and
- a miniaturized global positioning system (GPS) for navigation functionality.

42. The multi-purpose architecture of claim 41, wherein said standard-sized processor cards include a co-processor card, and an artificial intelligence (AI) accelerator card for artificial intelligence applications; and
- wherein said single-board processor card is used with said co-processor card to provide hardware acceleration with reduced communication overhead.

43. The multi-purpose architecture of claim 41, wherein said standard-sized processor cards include a Solid-State Data Recorder (SSDR) card for storage capacity.

44. The multi-purpose architecture of claim 42, wherein said single-board processor card serves as a front-end data processor for sensors directly interfaced to said single-board processor card, to process and convert raw sensor-data into compressed information provided to said co-processor card for downlink to a data storage.

* * * * *